Aug. 31, 1926.
A. S. HOWELL
1,598,445
SPLICED PHOTOGRAPHIC FILM
Filed April 9, 1923
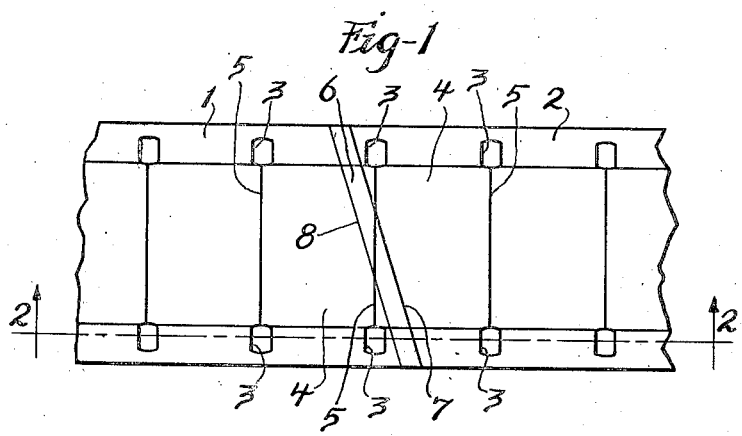
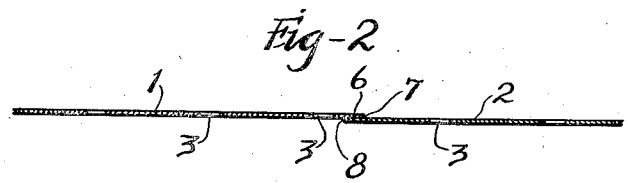
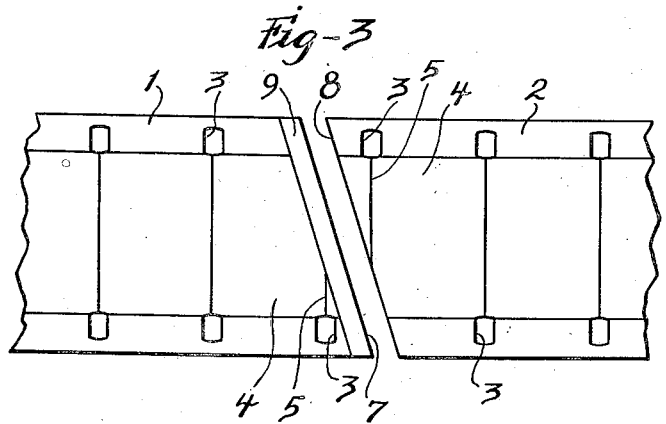
INVENTOR.
Albert S. Howell.
BY
Miehle & Miehle,
ATTORNEYS.

Patented Aug. 31, 1926.

1,598,445

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

SPLICED PHOTOGRAPHIC FILM.

Application filed April 9, 1923. Serial No. 630,800.

My invention relates particularly to motion picture film although not limited to this use alone.

The features of the invention relate to the provision of a spliced film in which the tendency to crack or part either at the splice or adjacent thereto is lessened to a considerable degree, and in which the disadvantages of spliced film are eliminated to a large extent. The invention is of particular advantage in motion picture films provided with uniformly longitudinally spaced pairs of transversely spaced marginal perforations and having picture sections arranged longitudinally of the film and extending transversely between the perforations and having their transverse edge portions at respective pairs of perforations.

With these features in view my invention consists in certain features of novelty in the construction, combination and arrangement of parts by which the above features and certain other features are effected, all as fully described with reference to the accompanying drawings and more particularly pointed out in the claims.

In the said drawings—

Figure 1 is a face view of a motion picture film embodying my invention.

Figure 2 is a section on the line 2—2 of Fig. 1.

Figure 3 is a face view of the sections of the film with the corresponding ends thereof prepared for splicing.

Like characters of reference indicate like parts in the various views.

In the said drawings 1 and 2 designate the two sections of the film spliced together to form the film. These sections of the film are provided with pairs of transversely spaced marginal perforations 3, which pairs are uniformly spaced longitudinally of the film as is usual. The film has uniform picture sections 4 arranged longitudinally of the film and extending transversely between the perforations and having their transverse edge portions at respective pairs of perforations, as designated at 5. The two sections of film are joined together by a splice 6 extending facewise of the film diagonally immediately across the same above one and immediately below the other of a pair of transversely spaced perforations 3, the sections of the film being so spliced that the uniform longitudinal spacing of the transversely spaced pairs of perforations is maintained at the spliced portion of the film.

The splice is formed by trimming the ends of the sections to be spliced on a diagonal corresponding with the diagonal of the splice, as designated at 7 and 8 respectively, and removing the emulsion covering the area of the splice on one of the ends to be spliced, as designated at 9 in Fig. 3, after which the prepared ends of the film sections are cemented together with the film sections held in proper relation.

It will be observed that this diagonal splicing provides a simply made splice of relatively great length and that the usual stiffness of the splice is distributed longitudinally of the film whereby the splice is relatively strong and whereby the tendency of the film to crack or part at or adjacent the splice is lessened to a considerable degree. The splice arranged as described with respect the adjacent picture sections extends partially into both of these picture sections and does not interfere with the pictures thereof to a great extent. The splice arranged as described with respect the adjacent pair of perforations distributes what disadvantageous tendency the splice may have on both sides of this pair of perforations and while centralized with respect these perforations leaves these perforations in normal unspliced portions of the film.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:—

1. The combination in a photographic film strip of a splice joining sections thereof and extending facewise of the film diagonally across the same at the adjoining portions of two successive picture sections arranged longitudinally of the film and extending partially into each of said picture sections.

2. The combination in a photographic film strip provided with longitudinally spaced pairs of transversely spaced perforations of a splice joining sections thereof and extending facewise of the film diagonally across the same immediately above one and immediately below the other of one of said pairs of perforations.

3. The combination in a photographic film strip provided with uniformly longitudinally spaced pairs of transversely spaced marginal perforations and having picture sections arranged longitudinally of the film and extending transversely between the perforations and having their transverse edge portions at respective pairs of perforations of a splice joining sections of the film and extending facewise of the film diagonally across the same immediately above one and immediately below the other of one of said pairs of perforations.

In witness whereof I hereunto affix my signature this 7th day of April, 1923.

ALBERT S. HOWELL.